US010311340B2

(12) United States Patent
Mori (10) Patent No.: US 10,311,340 B2
(45) Date of Patent: Jun. 4, 2019

(54) OBJECT RECOGNITION INTEGRATION DEVICE AND OBJECT RECOGNITION INTEGRATION METHOD

(71) Applicant: Mitsubishi Electric Corporation, Tokyo (JP)

(72) Inventor: Masanori Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 161 days.

(21) Appl. No.: 15/363,613

(22) Filed: Nov. 29, 2016

(65) Prior Publication Data

US 2017/0364775 A1    Dec. 21, 2017

(30) Foreign Application Priority Data

Jun. 17, 2016    (JP) .................................. 2016-120560

(51) Int. Cl.
*G06K 9/62* (2006.01)
*G06K 9/00* (2006.01)

(52) U.S. Cl.
CPC ......... *G06K 9/6277* (2013.01); *G06K 9/6288* (2013.01); *G06K 9/00791* (2013.01)

(58) Field of Classification Search
CPC ............... G06K 9/6277; G06K 9/6288; G06K 9/00791; G06K 9/00805; G06K 9/2018; G06K 9/4661; G06K 9/6293
See application file for complete search history.

(56) References Cited

U.S. PATENT DOCUMENTS

| 9,669,838 | B2 * | 6/2017 | Komar | B60W 40/04 |
| 2007/0182623 | A1 * | 8/2007 | Zeng | G01S 7/4026 |
| | | | | 342/174 |
| 2009/0208109 | A1 * | 8/2009 | Kakinami | B60Q 9/004 |
| | | | | 382/190 |
| 2010/0103262 | A1 * | 4/2010 | Fardi | B60R 1/00 |
| | | | | 348/148 |
| 2018/0225813 | A1 * | 8/2018 | Yokota | B60R 1/00 |

FOREIGN PATENT DOCUMENTS

| JP | 3931879 B2 | 6/2007 |
| JP | 5178276 B2 | 4/2013 |
| JP | 5617100 B2 | 11/2014 |

* cited by examiner

*Primary Examiner* — Yon J Couso
(74) *Attorney, Agent, or Firm* — Sughrue Mion, PLLC; Richard C. Turner (57) ABSTRACT

Provided are an object recognition integration device and an object recognition integration method, which are capable of integrating pieces of detection data that are detected by a respective plurality of sensors in consideration of an inaccuracy of identification of objects. An association relationship between measurement data and previous object data is determined based on an object type and a certainty for each object type candidate contained in measurement data generated for each of the plurality of sensors, and an object type and a certainty for each object type candidate contained in the previous object data. Then, association data is generated by associating the measurement data and the previous object data, which are determined as having "possibility of association", with each other, to thereby generate current object data by updating the previous object data with use of the association data.

3 Claims, 3 Drawing Sheets

| MEASUREMENT DATA / OBJECT DATA | FIRST SENSOR 1 (EXAMPLE: MILLIMETER WAVE RADAR) | | | SECOND SENSOR 2 (EXAMPLE: OPTICAL CAMERA) | |
|---|---|---|---|---|---|
| | VEHICLE | PEDESTRIAN | OTHER TYPE | VEHICLE | PEDESTRIAN |
| VEHICLE | ○ | × | △ | ○ | × |
| PEDESTRIAN | × | ○ | △ | × | ○ |
| OTHER TYPE | △ | △ | △ | △ | △ |

OBJECT RECOGNITION INTEGRATION DEVICE AND OBJECT RECOGNITION INTEGRATION METHOD

BACKGROUND OF THE INVENTION

1. Field of the Invention

The present invention relates to an object recognition integration device and an object recognition integration method, for integrating pieces of detection data of objects that are received from a respective plurality of sensors mounted on an own vehicle.

2. Description of the Related Art

Hitherto, there have been developed a preventive safety technology and an automatic driving technology for recognizing objects and the like around an own vehicle with use of a sensor fusion technology for integrating and fusing pieces of detection data that are detected by a respective plurality of sensors mounted on the own vehicle, and performing, based on the recognition result, various types of control such as inter-vehicle distance maintenance control, lane keeping control, and automatic braking control.

A related-art object recognition integration device (for example, refer to Japanese Patent No. 5178276) scans a front field of view of the own vehicle with a laser radar mounted on the own vehicle, and determines an object, which is detected outside a predetermined pedestrian detection range and tracked, as not being a pedestrian, to thereby exclude the object from a pedestrian detection candidate in an own vehicle front image photographed by an optical camera mounted on the own vehicle. Then, the object recognition integration device identifies, based on a relative speed and the like of an object detected and tracked by the laser radar, the object as any one of, for example, a preceding vehicle, an oncoming vehicle, and a stationary obstacle, to thereby exclude the object from the pedestrian detection candidate. Image recognition processing is performed on the image subjected to the exclusion processing with a pedestrian detection threshold value being set lower as an object becomes closer to a predicted own vehicle path, to thereby detect a pedestrian.

In the related art disclosed in Japanese Patent No. 5178276, in order to alleviate a load of image recognition processing on the optical camera, an object that is not a pedestrian is excluded from the pedestrian detection candidate based on the detection result of the laser radar, and remaining objects are subjected to the image recognition processing to detect a pedestrian. However, the object excluded from the pedestrian detection candidate may be a pedestrian.

For example, the reflection intensity of a laser radar is lower for a pedestrian than for a vehicle or the like. Thus, through reduction of the detection threshold value of a laser radar, it is possible to detect a pedestrian with the laser radar even when the pedestrian is outside the pedestrian detection range. In this case, the pedestrian thus detected is excluded from the pedestrian detection candidate of the optical camera.

On the other hand, when the detection threshold value of a laser radar is increased, it is not possible to detect a pedestrian with the laser radar even when the pedestrian is within the pedestrian detection range. Thus, in actuality, even when a pedestrian is present within the pedestrian detection range, the pedestrian is excluded from the pedestrian detection candidate of the optical camera.

Further, a stationary pedestrian cannot be distinguished from a stationary obstacle having the same degree of reflection intensity. Thus, when a detected object is determined as a stationary obstacle, the detected object is equally excluded from the pedestrian detection candidate of the optical camera.

The matters described above also hold true for cases such as when a vehicle or some object other than a pedestrian is set as a recognition target, or when a sensor, e.g., a millimeter wave radar, is used instead of the laser radar.

As can be understood from the above, the related-art object recognition integration device performs, based on a detection result of a sensor selected from among a plurality of sensors, detection processing with another sensor. Therefore, there is a problem in that the another sensor cannot detect an object that is not detected by the selected sensor or erroneous identification of an object even when the object is detected by the selected sensor.

SUMMARY OF THE INVENTION

The present invention has been made to solve, for example, the problem described above, and has an object to provide an object recognition integration device and an object recognition integration method, which are capable of integrating pieces of detection data that are detected by a respective plurality of sensors in consideration of an inaccuracy of identification of objects.

According to one embodiment of the present invention, there is provided an object recognition integration device, including: a data reception unit configured to: receive pieces of detection data from a respective plurality of sensors; generate measurement data for each of the respective plurality of sensors based on the received pieces of detection data; and output the measurement data for each of the respective plurality of sensors; an association data generation unit configured to: determine an association relationship between the measurement data output from the data reception unit and previous object data, which is object data at a processing time previous to a current processing time, as any one of "possibility of association" and "no possibility of association" based on an object type and a certainty for each object type candidate contained in the measurement data and an object type and a certainty for each object type candidate contained in the previous object data; associate the measurement data and the previous object data, which are determined as having the "possibility of association", with each other; generate association data in which the measurement data, the previous object data, and the association therebetween are stored; and output the generated association data; and an object data generation unit configured to: generate current object data, which is object data at the current processing time, by updating a state of an object, the object type, and the certainty contained in the previous object data based on the association data output from the association data generation unit; and output the generated current object data.

According to one embodiment of the present invention, there is provided an object recognition integration method, including: a data reception step of: receiving pieces of detection data from a respective plurality of sensors; generating measurement data for each of the respective plurality of sensors based on the received pieces of detection data; and outputting the measurement data for each of the respective plurality of sensors; an association data generation step of: determining an association relationship between the measurement data output in the data reception step and previous object data, which is object data at a processing time previous to a current processing time, as any one of "possibility of association" and "no possibility of association" based on an object type and a certainty for each object type candidate contained in the measurement data and an object type and a certainty for each object type candidate contained in the previous object data; associating the measurement data and the previous object data, which are determined as having the "possibility of association", with each other; generating association data in which the measurement data, the previous object data, and the association therebetween are stored; and outputting the generated association data; and an object data generation step of: generating current object data, which is object data at the current processing time, by updating a state of an object, the object type, and the certainty contained in the previous object data based on the association data output in the association data generation step; and outputting the generated current object data.

According to the present invention, there can be provided the object recognition integration device and the object recognition integration method, which are capable of integrating pieces of detection data that are detected by a respective plurality of sensors in consideration of an inaccuracy of identification of objects.

DETAILED DESCRIPTION OF THE PREFERRED EMBODIMENTS

Now, an object recognition integration device and an object recognition integration method according to an exemplary embodiment of the present invention are described referring to the accompanying drawings. In the illustration of the drawings, the same components or corresponding components are denoted by the same reference symbols, and the overlapping description thereof is herein omitted.

First Embodiment

Figure 1:
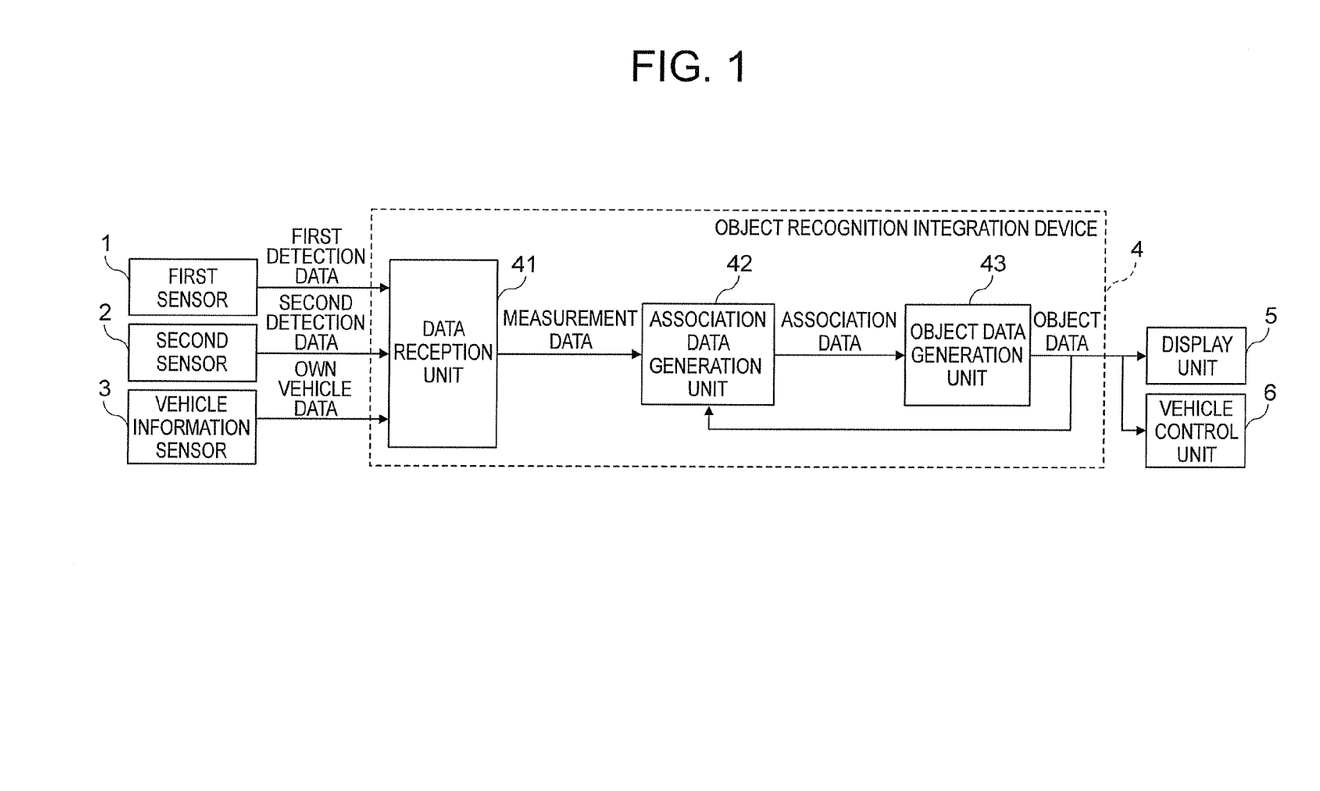
FIG. 1 is a block diagram for illustrating a configuration of an object recognition integration system including an object recognition integration device according to a first embodiment of the present invention.

FIG. 1 is a block diagram for illustrating a configuration of an object recognition integration system including an object recognition integration device 4 according to a first embodiment of the present invention. The object recognition integration system of FIG. 1 includes a first sensor 1, a second sensor 2, a vehicle information sensor 3, the object recognition integration device 4, a display unit 5, and a vehicle control unit 6.

The first sensor 1 and the second sensor 2 are types of sensors configured to detect, for example, a distance to an object, an angle of direction to the object, or a relative speed of the object by receiving light reflected by the object, a detection wave, e.g., an electromagnetic wave, or a detection wave reflected by the object after the detection wave is radiated to the object, and performing processing such as signal processing or image processing on the received detection wave. Specifically, a millimeter wave radar, a laser radar, an ultrasonic sensor, an infrared sensor, an optical camera, and other types of sensors may be used as the first sensor 1 and the second sensor 2.

It is assumed that mounting positions of the first sensor 1 and the second sensor 2 to an own vehicle and detection ranges of the first sensor 1 and the second sensor 2 are known. Further, for example, the mounting positions of the first sensor 1 and the second sensor 2 to the own vehicle may be arbitrarily set.

In the present invention, first detection data detected by the first sensor 1 and second detection data detected by the second sensor 2 are integrated, and thus it is desired that the detection range of the first sensor 1 and the detection range of the second sensor 2 have a common region, namely, an overlapping region. Further, the first sensor 1 and the second sensor 2 may be sensors of the same type. However, it is desired that the first sensor 1 and the second sensor 2 be sensors of different types in order to enable one sensor out of the first sensor 1 and the second sensor 2 to detect an object that cannot be detected by the other sensor.

Specifically, it is conceivable to use a millimeter wave radar as the first sensor 1, use an optical camera as the second sensor 2, mount the first sensor 1 on a center of a front bumper of the own vehicle, and mount the second sensor 2 on a back side of a rear-view mirror of the own vehicle, to thereby set the front field of view of the own vehicle as a detection range common to both the sensors.

The first sensor 1 and the second sensor 2 each detect information on an object present in a detectable detection range as detection data, and transmit the detection data to the object recognition integration device 4.

In this case, the detection data contains, for example, information on a relative position and a relative speed of an object detected by a sensor with respect to the sensor and information on the type of the object (hereinafter referred to as "object type"). In the following, the detection data detected by the first sensor 1 is represented as "first detection data" and the detection data detected by the second sensor 2 is represented as "second detection data".

For example, when the sensor is an optical camera, the object type contained in detection data of the optical camera is set in advance as an extraction target of image processing, and is set, for example, to any one of "vehicle" and "pedestrian". Objects other than those extraction targets of image processing are not contained in detection data of the optical camera except when the optical camera has made an erroneous detection.

Further, for example, when the sensor is a millimeter wave radar, the object type contained in detection data of the millimeter wave radar can be estimated from a feature amount such as a reflection intensity or a signal-to-noise ratio inherent in the detected object. For example, it is possible to identify a detected object as "vehicle" when the detected object has a large reflection intensity, or as "pedestrian" when the detected object has a small reflection intensity.

Even when the detected object is a vehicle, the detected object may have a small reflection intensity, or conversely, even when the detected object is an object other than a vehicle, the detected object may have a large reflection intensity. Thus, it is not necessarily possible to identify the type of a detected object with a millimeter wave radar. Therefore, the first embodiment is configured such that a feature amount is used to calculate a certainty for each object type candidate and the object type is identified based on the calculated value.

The phrase "certainty for each object type candidate" as used herein means a certainty of a detected object being an object type candidate, and is represented by a real number of from 0 to 1. As the value of the certainty becomes larger, the probability of the detected object being the object type candidate becomes higher.

For example, on the assumption that there are two object type candidates, "vehicle" and "pedestrian", when the certainty of a detected object being "vehicle" is 0.7 or more and the certainty of the detected object being "pedestrian" is less than 0.3, the object type is identified as "vehicle". On the other hand, when the object type cannot be identified as any one of "vehicle" and "pedestrian" based on the values of the certainty, the object type is classified into "other type" for the sake of convenience.

In the first embodiment, the following is assumed for the sake of clear description. Specifically, the first sensor 1 can detect a distance to an object and a relative speed of the object accurately, and identify an object with use of a feature amount, e.g., a reflection intensity, inherent in the object. However, the accuracy of identification is so low as to inhibit the object type from being identified accurately at all times.

Further, the second sensor 2 can detect an angle of direction to an object accurately, and identify the type of a detected object accurately. However, the second sensor 2 cannot detect objects other than those set as identification targets.

For example, the combination of the first sensor 1 being a millimeter wave radar and the second sensor 2 being an optical camera is conceivable as a combination of the sensor types of the first sensor 1 and the second sensor 2 that satisfies the assumption described above. However, the combination of the sensor types is not limited thereto.

The vehicle information sensor 3 is configured to detect information on the own vehicle as own vehicle data, and to transmit the own vehicle data to the object recognition integration device 4. The own vehicle data contains information such as a speed, a wheel speed, a steering angle, and a yaw rate of the own vehicle.

The vehicle information sensor 3 may be configured to use a global positioning system (GPS) to detect, for example, a longitude, a latitude, and a traveling direction of the own vehicle as the own vehicle data.

The object recognition integration device 4 is configured to estimate information on an object based on the first detection data received from the first sensor 1 and the second detection data received from the second sensor 2, and to output the estimation result as object data. The object recognition integration device 4 includes a data reception unit 41, an association data generation unit 42, and an object data generation unit 43. The object recognition integration device 4 is implemented by a processing circuit such as a CPU configured to execute a program stored in a memory or a system LSI.

The data reception unit 41 is configured to receive the first detection data from the first sensor 1, the second detection data from the second sensor 2, and the own vehicle data from the vehicle information sensor 3. Further, the data reception unit 41 generates measurement data for each of the first sensor 1 and the second sensor 2 based on the received data.

The data reception unit 41 outputs the measurement data generated for each sensor to the association data generation unit 42.

The association data generation unit 42 is configured to determine an association relationship between the measurement data input from the data reception unit 41 and object data input from the object data generation unit 43, to thereby associate the measurement data and the object data with each other. Further, the association data generation unit 42 generates association data in which the measurement data, the object data, and their association to each other are stored. The association data generation unit 42 outputs the generated association data to the object data generation unit 43.

The object data generation unit 43 is configured to update the object data based on the association data input from the association data generation unit 42, to thereby output the updated object data.

The object data contains, for example, information on an object state, an object type, and a certainty for each object type candidate detected by the first sensor 1 or the second sensor 2. The object state is information such as a position vector, a velocity vector, or an acceleration vector. Further, the object data generation unit 43 updates the object state with use of, for example, a least-square method, the Kalman filter, or a particle filter.

The object type contained in the object data may be set separately from the object type contained in the detection data detected by each of the first sensor 1 and the second sensor 2. However, in order to utilize the identification result of each sensor, it is desired that the object type contained in the object data include the object type contained in the detection data detected by each sensor to the largest extent possible.

For example, in the case of a configuration in which the object type contained in detection data of a millimeter wave radar is identified as any one of "vehicle", "pedestrian", and "other type", and the object type contained in detection data of an optical camera is identified as any one of "vehicle" and "pedestrian", the object type contained in the object data is set to be identified as any one of "vehicle", "pedestrian", and "other type". Further, the certainty for each object type candidate contained in the object data is represented by a real number of from 0 to 1.

The object data generation unit 43 outputs the object data to the display unit 5 such as an instrumental panel inside the own vehicle or a head-mounted display. In this case, the display unit 5 displays the object data input from the object data generation unit 43 to, for example, a driver.

Further, the object data generation unit 43 outputs the object data to the vehicle control unit 6 such as a braking control apparatus or a steering control apparatus. In this case, the vehicle control unit 6 uses the object data input from the object data generation unit 43 to perform control such as inter-vehicle distance maintenance control, lane keeping control, and automatic braking control.

Figure 2:
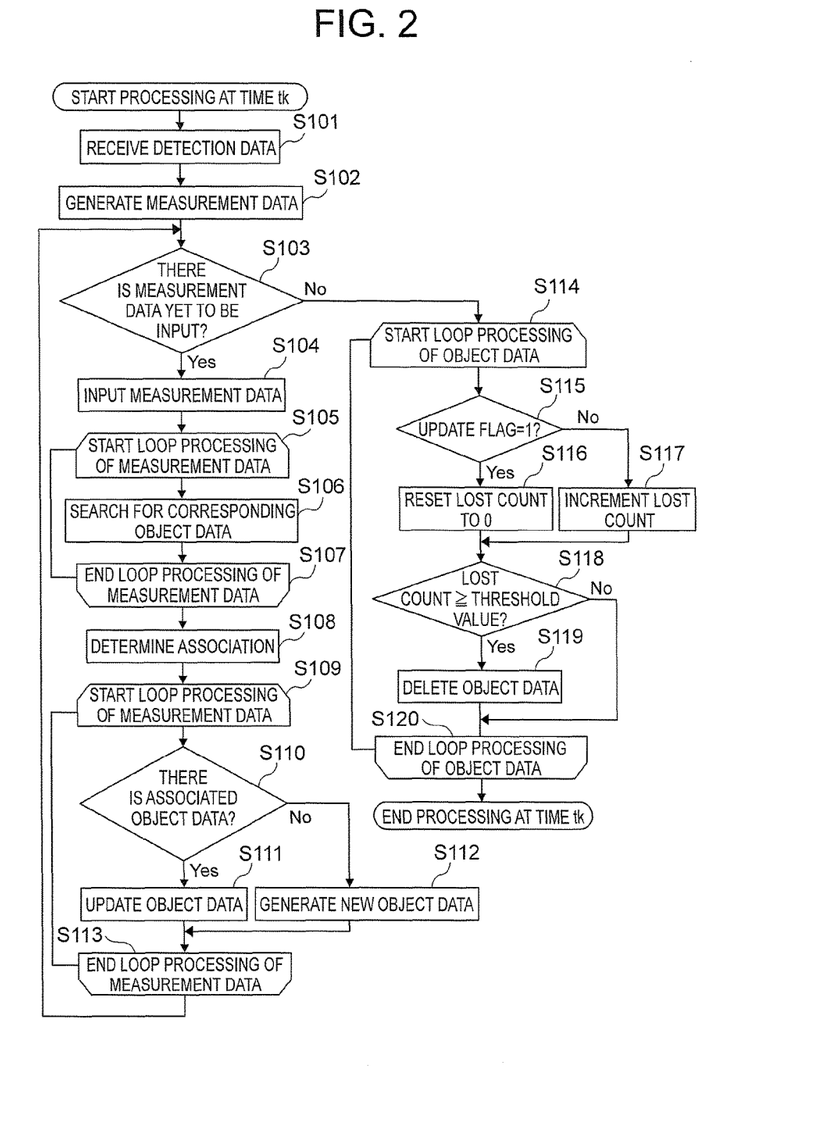
FIG. 2 is a flowchart for illustrating an operation of the object recognition integration device according to the first embodiment of the present invention.

Next, an operation of the object recognition integration device 4 according to the first embodiment is described with reference to FIG. 2. FIG. 2 is a flowchart for illustrating the operation of the object recognition integration device 4 according to the first embodiment of the present invention.

The object recognition integration device 4 executes processing of the flowchart of FIG. 2 repeatedly at an operation period set in advance. Further, the processing of the flowchart of FIG. 2 represents an operation of the object recognition integration device 4 at a certain processing time tk, namely, at a current processing time tk. In the following, a processing time previous to the current processing time tk is represented by tk−1. Further, object data at the processing time tk is represented by "current object data", and object data at the processing time tk−1 is represented by "previous object data".

First, in Step S101, the data reception unit 41 receives the first detection data from the first sensor 1 and the second detection data from the second sensor 2, and the processing proceeds to Step S102.

In Step S101, the data reception unit 41 receives the detection data from each of the first sensor 1 and the second sensor 2, and receives the own vehicle data from the vehicle information sensor 3 together with the detection data. Further, reception of the first detection data, the second detection data, and the own vehicle data is performed within a time period from the processing time tk−1 to the processing time tk.

Further, the data reception unit 41 does not necessarily receive the detection data from both of the first sensor 1 and the second sensor 2, but may receive the detection data from only one of those sensors or may not receive the detection data from both of the sensors.

In Step S102, the data reception unit 41 generates measurement data for each sensor based on the first detection data received from the first sensor 1 and the second detection data received from the second sensor 2, and the processing proceeds to Step S103. When the data reception unit 41 does not receive the detection data from both of the first sensor 1 and the second sensor 2, the data reception unit 41 does not generate the measurement data.

Further, when the data reception unit 41 receives the detection data from both of the first sensor 1 and the second sensor 2, the data reception unit 41 determines an order of inputting to the association data generation unit 42 the measurement data of the first sensor 1 generated based on the first detection data and the measurement data of the second sensor 2 generated based on the second detection data.

The order of inputting those pieces of measurement data to the association data generation unit 42 is determined, for example, such that the measurement data of each sensor is input to the association data generation unit 42 in a reception order of the detection data from each sensor.

Further, the data reception unit 41 resets an input state of the measurement data generated for each sensor to "not input yet".

Now, a description is given of a specific example of generation of measurement data for each sensor. For example, the data reception unit 41 uses the own vehicle data received from the vehicle information sensor 3 to process the first detection data and the second detection data as necessary, to thereby generate the measurement data for each sensor.

More specifically, for example, when a relative speed of an object is contained in the received detection data, the data reception unit 41 combines the relative speed with an own vehicle speed contained in the received own vehicle data to calculate a ground speed of the object, and generates the calculation result as the measurement data.

The first detection data and the second detection data may be used as they are to generate the measurement data of the first sensor and the measurement data of the second sensor, respectively, without processing the first detection data and the second detection data.

In this manner, the data reception unit 41 receives pieces of detection data from a respective plurality of sensors, generates measurement data for each sensor based on the received detection data, and outputs the measurement data for each sensor. Further, the association data generation unit 42 sets update flags of all the pieces of object data to 0.

In Step S103, the data reception unit 41 determines whether or not there is measurement data yet to be input for any sensor. When it is determined that there is measurement data yet to be input for a certain sensor, the processing proceeds to Step S104. On the contrary, when it is determined that there is no measurement data yet to be input for any sensor, the data reception unit 41 overwrites current object data with previous object data, and resets all the selection states of the current object data to "not selected yet". Then, the processing proceeds to Step S114.

In Step S104, the data reception unit 41 selects measurement data of a sensor yet to be input, and inputs the selected measurement data to the association data generation unit 42. Then, the processing proceeds to Step S105.

In Step S104, the association data generation unit 42 resets the selection state of the measurement data input from the data reception unit 41 to "not selected yet". Further, the association data generation unit 42 inputs previous object data from the object data generation unit 43.

In Step S105, the association data generation unit 42 determines whether or not there is measurement data yet to be selected among pieces of measurement data input from the data reception unit 41. When it is determined that there is measurement data yet to be selected, the association data generation unit 42 selects one piece of measurement data yet to be selected, and changes the selection state of the measurement data to "selected". Then, the processing proceeds to Step S106. On the contrary, when it is determined that there is no measurement data yet to be selected, the processing proceeds to Step S107 to end the loop processing of measurement data. Then, the processing proceeds to Step S108.

In Step S106, the association data generation unit 42 searches for previous object data that has a possibility of corresponding to the measurement data selected in Step S105.

In this case, assuming that detection data of an object can be obtained spatially continuously in chronological order and pieces of detection data that are obtained when the same object is detected by each sensor are in a spatially close relationship, it is possible to determine an association relationship between previous object data and measurement data. Specifically, when a length of a residual vector between the previous object data and the measurement data, such as that of a position or a speed, is larger than a threshold value, the association relationship is determined as "no possibility of association". On the contrary, when the length of the residual vector is equal to or smaller than the threshold value, the association relationship is determined as "possibility of association".

As a specific example, the association data generation unit 42 calculates, for all the pieces of previous object data input from the object data generation unit 43 to the association data generation unit 42, a residual vector between a predicted value of a position vector calculated based on a state vector of each piece of previous object data and a position vector of the selected measurement data. Then, the association data generation unit 42 determines that the previous object data and the selected measurement data have "possibility of association" when a Euclidean distance of the residual vector is equal to or less than a threshold value set in advance as the calculation result.

In determination of an association relationship between previous object data and measurement data, "possibility of association" may be determined, for example, when an absolute value of a residual of a longitudinal position is equal to or less than a threshold value and a residual of a horizontal position is equal to or less than a threshold value, instead of determination with use of the Euclidean distance of the residual vector described above. Further, when the Kalman filter is used for updating a state of an object contained in previous object data, a Mahalanobis distance obtained by normalizing the residual vector with an error covariance matrix may be used to determine an association relationship. Further, the association relationship may be determined by including in the residual vector not only the position vector but also a doppler speed or a residual of a speed vector.

In this manner, the association data generation unit 42 performs association possibility determination using a residual vector for an association relationship between measurement data and previous object data.

However, "possibility of association" may be determined erroneously for measurement data and previous object data that is associated with an object different from that associated with the measurement data because there may exist an object that is detectable by one sensor but not detectable by another sensor, or an error of detection data may be large.

Further, when an association relationship between the measurement data and the previous object data is not determined correctly, abnormal information may be displayed or an unintended operation, such as unintended acceleration, unintended braking, or unintended steering, may occur during vehicle control because the state of an object contained in previous object data may be different from an actual behavior of the object.

Thus, in Step S106, the association data generation unit 42 compares an object type contained in measurement data with an object type contained in previous object data. When the object type contained in measurement data and the object type contained in previous object data are different from each other based on the comparison result, the association data generation unit 42 determines that the measurement data and the previous object data having different object types have "no possibility of association", to thereby correct the association possibility determination that is made with use of the residual vector.

However, the object type contained in measurement data does not necessarily correspond to the object type contained in previous object data on a one-to-one basis. For example, the object type contained in measurement data generated based on detection data of a millimeter wave radar may be erroneous or the object type may be impossible to identify because the millimeter wave radar has a low accuracy of identification. Further, for example, although an optical camera has a high accuracy of identification, the optical camera cannot detect an object other than an identification target. Thus, there may exist an object type contained in previous object data, which is different from that contained in measurement data generated based on detection data of the optical camera.

Figure 3:
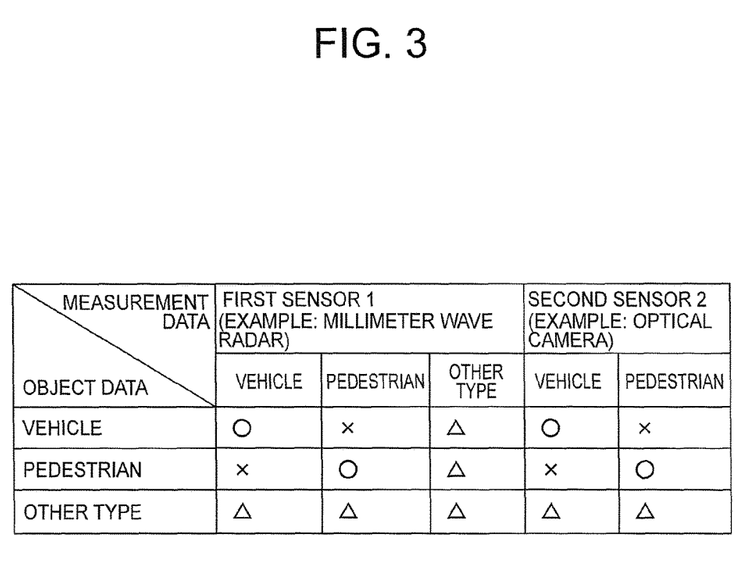
FIG. 3 is an association table for correcting an association possibility determination that is made with use of a residual vector, which is to be used by an association data generation unit according to the first embodiment of the present invention.

Thus, in Step S106, the association data generation unit 42 uses an association table shown in FIG. 3 to correct the association possibility determination that is made with use of the residual vector. FIG. 3 is an association table for correcting an association possibility determination that is made with use of a residual vector, which is used by the association data generation unit 42 according to the first embodiment of the present invention.

Specifically, when both of the object type contained in measurement data and the object type contained in previous object data are identified, the association data generation unit 42 maintains the determination of "possibility of association" only when the object types are the same as each other. On the contrary, when the object types are different from each other, the association data generation unit 42 does not maintain the determination of "possibility of association", that is, corrects the determination of "possibility of association" to "no possibility of association".

On the contrary, when the object type contained in measurement data or the object type contained in previous object data is not identified, that is, when the object type is classified as "other type", the association data generation unit 42 uses the certainty for each object type candidate contained in data to determine whether or not to maintain the determination of "possibility of association".

Specifically, in the case of a combination of object types corresponding to "x" as shown in FIG. 3, the association data generation unit 42 corrects the association possibility determination that is made with use of the residual vector to "no possibility of association" when the determination is "possibility of association".

In short, in the case of a combination of object types corresponding to "x", "no possibility of association" is determined. On the basis of this rule, when the object types are different from each other for an association relationship between measurement data and previous object data, "no possibility of association" is determined.

In the case of a combination of object types corresponding to "o", the association possibility determination that is made with use of the residual vector is maintained when the determination is "possibility of association".

In short, in the case of a combination of object types corresponding to "o", "possibility of association" is determined. On the basis of this rule, when the object types are the same as each other for an association relationship between measurement data and previous object data, "possibility of association" is determined.

In this manner, when both of the object types contained in measurement data and previous object data are identified, the association data generation unit 42 determines the association relationship depending on whether or not the object types contained in measurement data and previous object data are different from each other.

In the case of a combination of object types corresponding to "Δ", the association possibility determination that is made with use of the residual vector is maintained when the determination is "possibility of association" on the condition that the certainty for each object type candidate contained in previous object data and the certainty for each object type candidate contained in selected measurement data are similar to each other.

For example, consideration is given to a case in which the object type contained in previous object data is "pedestrian", the selected measurement data is generated based on detection data of a millimeter wave radar serving as the first sensor 1, and the object type contained in the measurement data is "other type".

In the above-mentioned case, the determination of "possibility of association" is maintained when the certainty of the object being "pedestrian" is larger than the certainty of the object being "vehicle" and is equal to or more than a threshold value set in advance (e.g., 0.3) in terms of the certainty for each object type candidate contained in the selected measurement data.

In short, in the case of a combination of object types corresponding to "Δ", when the certainty corresponding to "pedestrian" identified in the previous object data is large in the measurement data, "possibility of association" is determined. On the basis of this rule, when the certainty corresponding to the object type identified in the previous object data is large in the measurement data in terms of the association relationship between the measurement data and the previous object data, "possibility of association" is determined.

On the contrary, when the certainty of the object being "pedestrian" is smaller than the certainty of the object being "vehicle" in terms of the certainty for each object type candidate contained in the selected measurement data, the determination of "possibility of association" is corrected to "no possibility of association".

In short, in the case of a combination of object types corresponding to "Δ", when the certainty corresponding to "pedestrian" identified in the previous object data is small in the measurement data, "no possibility of association" is determined. On the basis of this rule, when the certainty corresponding to the object type identified in the previous object data is small in the measurement data in terms of the association relationship between the measurement data and the previous object data, "no possibility of association" is determined.

In this manner, when the object type contained in one of the measurement data and the previous object data is identified and the object type contained in the other of the measurement data and the previous object data is not identified, the association relationship is determined in accordance with the certainty in the other data, which corresponds to the object type identified in the one data.

In the first embodiment, the association relationship between the measurement data and the previous object data may be determined without performing the association possibility determination that is made with use of the residual vector. In this case, the association data generation unit 42 determines the association relationship based on the object type and the certainty for each object type candidate contained in the measurement data, and the object type and the certainty for each object type candidate contained in the previous object data.

As described above, the association data generation unit 42 determines any one of "possibility of association" and "no possibility of association" as the association relationship based on the object type and the certainty for each object type candidate contained in the measurement data input from the data reception unit 41, and the object type and the certainty for each object type candidate contained in the previous object data.

Referring back to the description of FIG. 2, in Step S108, the association data generation unit 42 associates the previous object data with the measurement data based on the association relationship determined in Step S106, and the processing proceeds to Step S109.

In other words, the association data generation unit 42 determines which pair of previous object data and measurement data comes from the same object for pieces of previous object data and measurement data determined as having "possibility of association" in Step S106.

When there is no measurement data determined as having "possibility of association" with the previous object data, the association data generation unit 42 does nothing. When there is one or more pieces of measurement data determined as having "possibility of association" with the previous object data, the association data generation unit 42 uniquely determines measurement data to be associated with object data based on the magnitude of a residual vector between the previous object data and the measurement data. Specifically, the association data generation unit 42 associates with the previous object data measurement data having the smallest weighted average of residual vectors between the measurement data and the previous object data among pieces of measurement data determined as having "possibility of association" with the previous object data.

A weighted average of position vectors may be calculated for a plurality of pieces of measurement data determined as having "possibility of association" with the previous object data, to thereby set the weighted average as a representative value for association with the previous object data. For example, a simple nearest neighbor (SNN) algorithm, a global nearest neighbor (GNN) algorithm, or a joint probabilistic data association (JPDA) algorithm may be used.

Further, measurement data having the smallest weighted average of the residual vector between the previous object data and the measurement data and a residual of certainty between the previous object data and the measurement data may be associated with the previous object data among pieces of measurement data determined as having "possibility of association" with the previous object data.

Further, measurement data having the largest certainty for the same object type as the object type contained in the previous object data may be associated with the previous object data among pieces of measurement data determined as having "possibility of association" with the previous object data. In other words, in terms of the certainty for each object type candidate contained in pieces of measurement data, measurement data having the largest certainty corresponding to the same object type as the object type contained in the previous object data is associated with the previous object data.

Further, among pieces of measurement data determined as having "possibility of association" with the previous object data, measurement data having a certainty for each object type candidate most similar to that contained in the previous object data may be associated with the previous object data.

For example, it is assumed that, regarding the certainty for each object type candidate contained in previous object data, the certainty of the object being "vehicle" is 0.40 and the certainty of the object being "pedestrian" is 0.20. In addition, it is assumed that there are two pieces of measurement data A and B.

Further, it is assumed that, regarding the certainty for each object type candidate contained in the measurement data A, the certainty of the object being "vehicle" is 0.35 and the certainty of the object being "pedestrian" is 0.25. Further, it is assumed that, regarding the certainty for each object type candidate contained in the measurement data B, the certainty of the object being "vehicle" is 0.35 and the certainty of the object being "pedestrian" is 0.40.

In the above-mentioned case, among the two pieces of measurement data A and B determined as having "possibility of association" with previous object data, the measurement data A having the certainty for each object type candidate most similar to that contained in the previous object data is associated with the previous object data.

The methods of determining the association described above may be combined arbitrarily with conditions depending on, for example, a distance from the own vehicle to object data or measurement data, an angle of the own vehicle toward object data or measurement data, a relative speed of the own vehicle with respect to object data or measurement data, or the number of times object data and measurement data are associated with each other.

The association data generation unit 42 inputs association data in which the previous object data, the measurement data, and their association to each other are stored to the object data generation unit 43. Further, the object data generation unit 43 resets the selection state of measurement data contained in association data to "not selected yet".

In this manner, the association data generation unit 42 associates measurement data and previous object data, which are determined as having "possibility of association", with each other, to thereby generate association data.

In Step S109, the object data generation unit 43 determines whether or not there is a piece of measurement data yet to be selected among pieces of association data input from the association data generation unit 42. When it is determined that there is measurement data yet to be selected, the object data generation unit 43 selects one piece of measurement data yet to be selected, and the processing proceeds to Step S110. On the contrary, when it is determined that there is no measurement data yet to be selected, the processing proceeds to Step S113 to end the loop processing of measurement data. Further, the object data generation unit 43 overwrites the previous object data with the current object data, and sets the measurement data of the sensor to "already input". Then, the processing returns to Step S103.

In Step S110, the object data generation unit 43 determines whether or not there is previous object data associated with the selected measurement data among pieces of association data input from the association data generation unit 42. When it is determined that there is previous object data associated with the selected measurement data, the processing proceeds to Step S111. On the contrary, when it is determined that there is no previous object data associated with the selected measurement data, the processing proceeds to Step S112.

In Step S111, the object data generation unit 43 uses the selected measurement data to update the state of the object, the object type, and the certainty for each object type candidate contained in previous object data associated with the selected measurement data, and generates the updated previous object data as current object data.

The state of an object contained in the previous object data, such as a position vector, a velocity vector, or an acceleration vector, is updated with use of, for example, a least-square method, the Kalman filter, or a particle filter. Further, the object type and the certainty for each object type candidate contained in the previous object data are updated by, for example, using the object type and the certainty for each object type candidate contained in the selected measurement data.

A weighted average of the certainty for each object type candidate contained in the previous object data and the certainty for each object type candidate contained in the selected measurement data may be calculated, to thereby determine the object type contained in the previous object data based on the calculation result. In this case, it is desired that the weighting of certainty be changed depending on the type of sensor, specifically, such that the weighting corresponding to an optical camera serving as the second sensor 2 is high and the weighting corresponding to a millimeter wave radar serving as the first sensor 1 is low. Then, the object data generation unit 43 determines the object type contained in the previous object data based on the updated certainty.

The object data generation unit 43 sets the update flag to 1 for the previous object data that has been updated with use of the selected measurement data.

On the other hand, in Step S112, the object data generation unit 43 generates new object data as the current object data based on the selected measurement data, and sets the update flag to 1.

In this manner, the object data generation unit 43 updates the state of an object, the object type, and the certainty for each object type candidate contained in the previous object data based on the association data input from the association data generation unit 42, to thereby generate the updated previous object data as the current object data.

In Step S114, the object data generation unit 43 determines whether or not there is current object data yet to be selected. When it is determined that there is current object data yet to be selected, the object data generation unit 43 selects one piece of current object data yet to be selected, and sets the selection state to "already selected". Then, the processing proceeds to Step S115. On the contrary, when it is determined that there is no current object data yet to be selected, the processing proceeds to Step S120 to end the loop processing of current object data.

In Step S115, the object data generation unit 43 determines whether or not the update flag is 1 for the selected current object data. When it is determined that the update flag is 1, the processing proceeds to Step S116. On the contrary, when it is determined that the update flag is not 1, the processing proceeds to Step S117.

In Step S116, the object data generation unit 43 resets a lost count to 0 for the selected current object data, and the processing proceeds to Step S118.

In Step S117, the object data generation unit 43 increments the lost count for the selected current object data, and the processing proceeds to Step S118.

In Step S118, the object data generation unit 43 determines whether or not the lost count is equal to or more than a threshold value set in advance for the selected current object data. When it is determined that the lost count is equal to or more than the threshold value, the processing proceeds to Step S119. On the contrary, when it is determined that the lost count is not equal to or more than the threshold value, the object data generation unit 43 selects next current object data yet to be selected.

In Step S119, the object data generation unit 43 determines that the selected current object data is no longer associated with measurement data generated based on detection data of any sensor and the object can no longer be detected by any sensor, and deletes the selected current object data.

Then, the object data generation unit 43 outputs the current object data to the association data generation unit 42, the display unit 5, and the vehicle control unit 6 to end the processing at the processing time tk.

As described above, the first embodiment is configured in the following manner. Specifically, the association relationship between measurement data and previous object data is determined based on the object type and the certainty for each object type candidate contained in measurement data generated for each of a plurality of sensors, and the object type and the certainty for each object type candidate contained in previous object data. Then, association data is generated by associating measurement data and previous object data, which are determined as having "possibility of association", with each other, to thereby generate current object data by updating previous object data with use of the association data.

With this configuration, it is possible to integrate pieces of detection data that are detected by a respective plurality of sensors in consideration of an inaccuracy of identification of objects. Further, even when there exists an object that is detectable by one sensor but not detectable by another sensor, or an error of detection data is large, it is possible to associate detection data with object data correctly and improve the recognition accuracy of the entire sensor system.

In the first embodiment, a description is given of an example in which the present invention is applied to a case of the own vehicle having two sensors mounted thereon. However, the present invention can also be applied to a case of the own vehicle having three or more sensors mounted thereon.

What is claimed is:

1. An object recognition integration device, comprising:
at least one processor which implements:
  a data reception unit configured to:
    receive pieces of detection data from a respective plurality of sensors;
    generate measurement data for each of the respective plurality of sensors based on the received pieces of detection data; and
    output the measurement data for each of the respective plurality of sensors;
  an association data generation unit configured to:
    determine an association relationship between the measurement data output from the data reception unit and previous object data, which is object data generated at a processing time previous to a current processing time based on previous measurement data output from the data reception unit at the processing time previous to the current processing time, as any one of a possibility of association and no possibility of association based on an object type and a certainty for each object type candidate contained in the measurement data and an object type and a certainty for each object type candidate contained in the previous object data;
    associate the measurement data and the previous object data, which are determined as having the possibility of association, with each other;
    generate association data in which the measurement data, the previous object data, and the association therebetween are stored; and
    output the generated association data; and
  an object data generation unit configured to:
    generate current object data, which is object data at the current processing time, by updating a state of an object, the object type, and the certainty contained in the previous object data based on the association data output from the association data generation unit; and
    output the generated current object data to a vehicle control unit configured to perform automatic driving control of a vehicle based on the current object data,
wherein the association data generation unit is further configured to:
  perform association possibility determination with use of a residual vector for the association relationship between the measurement data and the previous object data; and
  determine the association relationship by correcting the association possibility determination based on the object type and the certainty contained in the measurement data and the object type and the certainty contained in the previous object data.

2. An object recognition integration device, comprising:
at least one processor which implements:
  a data reception unit configured to:
    receive pieces of detection data from a respective plurality of sensors;
    generate measurement data for each of the respective plurality of sensors based on the received pieces of detection data; and
    output the measurement data for each of the respective plurality of sensors;
  an association data generation unit configured to:
    determine an association relationship between the measurement data output from the data reception unit and previous object data, which is object data generated at a processing time previous to a current processing time based on previous measurement data output from the data reception unit at the processing time previous to the current processing time, as any one of a possibility of association and no possibility of association based on an object type and a certainty for each object type candidate contained in the measurement data and an object type and a certainty for each object type candidate contained in the previous object data;
    associate the measurement data and the previous object data, which are determined as having the possibility of association, with each other;
    generate association data in which the measurement data, the previous object data, and the association therebetween are stored; and
    output the generated association data; and
  an object data generation unit configured to:
    generate current object data, which is object data at the current processing time, by updating a state of an object, the object type, and the certainty contained in the previous object data based on the association data output from the association data generation unit; and
    output the generated current object data to a vehicle control unit configured to perform automatic driving control of a vehicle based on the current object data,
wherein the association data generation unit is further configured to associate the previous object data with measurement data having a smallest weighted average of residual vectors between the previous object data and the measurement data among pieces of the measurement data determined as having the possibility of association with the previous object data.

3. An object recognition integration method, comprising:
a data reception step of:
  receiving pieces of detection data from a respective plurality of sensors;
  generating measurement data for each of the respective plurality of sensors based on the received pieces of detection data; and
  outputting the measurement data for each of the respective plurality of sensors;
an association data generation step of:
  determining an association relationship between the measurement data output in the data reception step and previous object data, which is object data generated at a processing time previous to a current processing time based on previous measurement data output in the data reception step at the processing time previous to the current processing time, as any one of a possibility of association and no possibility of association based on an object type and a certainty for each object type candidate contained in the measurement data and an object type and a certainty for each object type candidate contained in the previous object data;

associating the measurement data and the previous object data, which are determined as having the possibility of association, with each other;

generating association data in which the measurement data, the previous object data, and the association therebetween are stored; and outputting the generated association data; and an object data generation step of:

generating current object data, which is object data at the current processing time, by updating a state of an object, the object type, and the certainty contained in the previous object data based on the association data output in the association data generation step; and outputting the generated current object data to a vehicle control unit that performs automatic driving control of a vehicle based on the current object data, wherein the association data generation step further comprises associating the previous object data with measurement data having a smallest weighted average of a residual vector between the previous object data and the measurement data and a residual of the certainty between the previous object data and the measurement data among pieces of the measurement data determined as having the possibility of association with the previous object data.

* * * * *